Oct. 6, 1942.  I. E. COFFEY  2,298,197
WINDSHIELD WIPER MECHANISM
Filed Dec. 16, 1939  5 Sheets-Sheet 1

INVENTOR.
IRVEN E. COFFEY
BY Donald U. Rich
ATTORNEY.

Oct. 6, 1942.    I. E. COFFEY    2,298,197
WINDSHIELD WIPER MECHANISM
Filed Dec. 16, 1939    5 Sheets-Sheet 2

INVENTOR.
IRVEN E. COFFEY
BY Donald U. Rich
ATTORNEY.

Oct. 6, 1942.     I. E. COFFEY     2,298,197
WINDSHIELD WIPER MECHANISM
Filed Dec. 16, 1939     5 Sheets-Sheet 3

INVENTOR.
IRVEN E. COFFEY
BY Donald U. Rich
ATTORNEY.

Oct. 6, 1942.   I. E. COFFEY   2,298,197
WINDSHIELD WIPER MECHANISM
Filed Dec. 16, 1939   5 Sheets-Sheet 4

INVENTOR.
IRVEN E. COFFEY
BY
ATTORNEY.

Oct. 6, 1942.            I. E. COFFEY            2,298,197
WINDSHIELD WIPER MECHANISM
Filed Dec. 16, 1939            5 Sheets-Sheet 5

INVENTOR.
IRVEN E. COFFEY
BY
ATTORNEY.

Patented Oct. 6, 1942

2,298,197

UNITED STATES PATENT OFFICE 2,298,197

WINDSHIELD WIPER MECHANISM

Irven E. Coffey, Normandy, Mo., assignor to Carter Carburetor Corporation, St. Louis, Mo., a corporation of Delaware Application December 16, 1939, Serial No. 309,512

10 Claims. (Cl. 15—255)

This invention relates to windshield wipers of the type especially adapted for use with automobiles and trucks and consists in novel transmission, stroke varying, and parking mechanisms.

In modern automobiles and trucks, the windshield wiper arms are usually pivotally mounted for oscillation across the surface of the windshield and driven by a suction or electric motor or by a transmission connection to a rotating part of the engine. Where the driving member reciprocates at an even pace in a straight line or linearly, instead of moving angularly about a pivot, the motion of such member transmitted directly to a pivoted wiper arm results in the angular velocity of the wiper arm varying nearly harmonically from relatively slow movement at the center of the wiper stroke to faster movement at the end where the reversal in direction occurs. It would be desirable to reverse this angular velocity relationship at the ends and center of the wiper stroke so that the blade is travelling relatively slowly at the points of reversal.

Consequently, it is an important object of the present invention to provide a transmission for connecting a driving member subject to linear back and forth movement to a pivoted wiper arm in such a manner that the angular velocity of the arm will be greater at the center of the stroke than at the ends thereof.

Where the wiper arm is operated by a fluid motor having an automatically tripped reversing valve mechanism, the blade must move to the end of its normal stroke before the motor will reverse. In some cases, snow and ice may become packed at the end of the blade path and accumulate to such an extent as to prematurely stop the blade and thus prevent tripping of the motor. The wiper cannot be operated thereafter until the accumulated snow and ice is removed.

It is another object of the present invention to provide means for decreasing the normal travel of the wiper blade without affecting the operation of the motor so that the wiper may be maintained in operation over a more limited area in case snow and ice become packed at the end of the normal stroke.

Another object is to provide means for manually varying the transmission between the wiper arm and driving mechanism in such a manner as to cause the arm to engage a parking stop before the driving mechanism can move to the full end of its stroke and before the reversing device is actuated.

Still another object is to provide means for overparking of the wiper blade without altering or directly affecting any part of the driving motor or valves.

These objects and other more detailed objects hereafter appearing are attained substantially by the device illustrated in the accompanying drawings in which Fig. 1 is a somewhat diagrammatic view showing the outside of an automobile windshield and cowl, portions of the cowl being broken away to illustrate the underlying driving mechanism.

Figure 1:
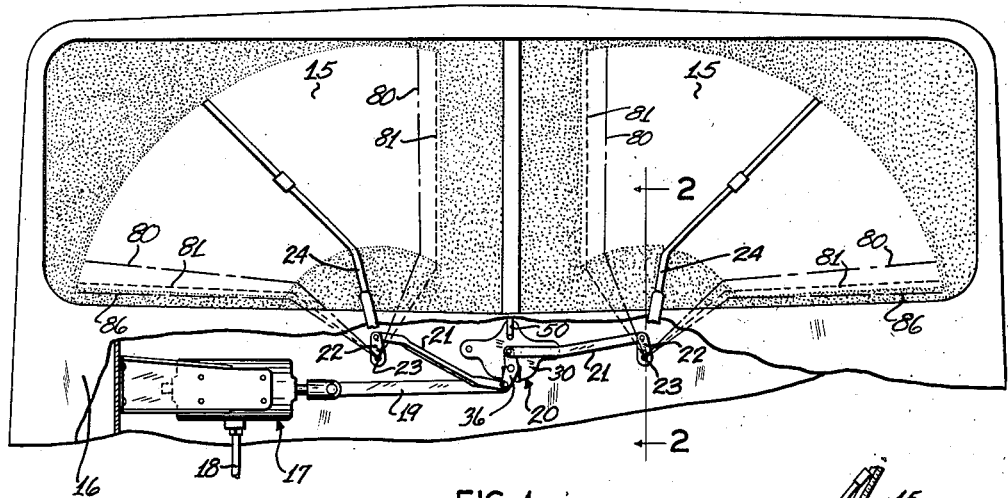

Fig. 1 is a partial front view of an automotive vehicle showing the windshield panes 15, cowl 16, and driving motor, generally indicated at 17, having a suction connection 18 to the engine intake manifold (not shown). Motor 17 is connected by a link 19 to the center or leverage portion of the transmission, generally indicated at 20, which portion is connected by means of links 21 to levers 22 rigid on shafts 23 extending through the cowl and, at their outer ends, mounting wiper arms 24 of any suitable construction.

Figure 2:
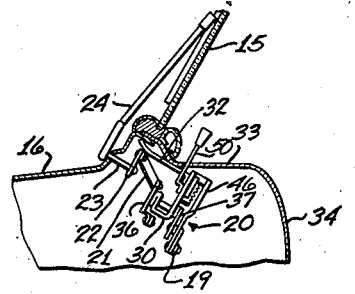
Fig. 2 is a detailed section taken substantially on line 2—2 of Fig. 1.
Figure 3:
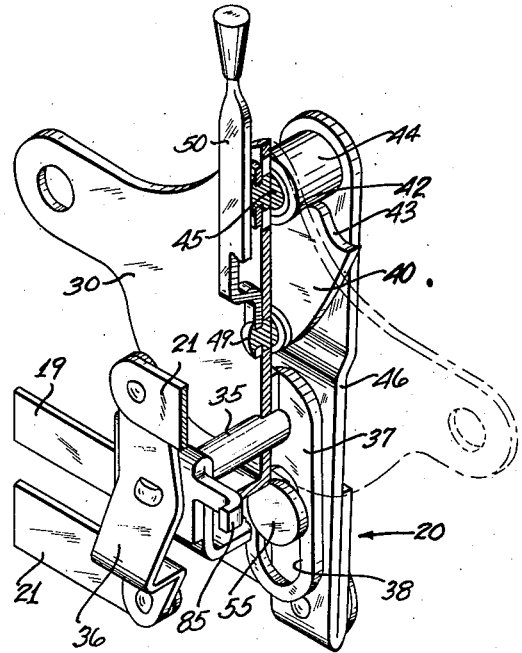
Fig. 3 is a perspective and vertical transverse center section illustrating the center or leverage portion of the transmission mechanism.
Figure 4:
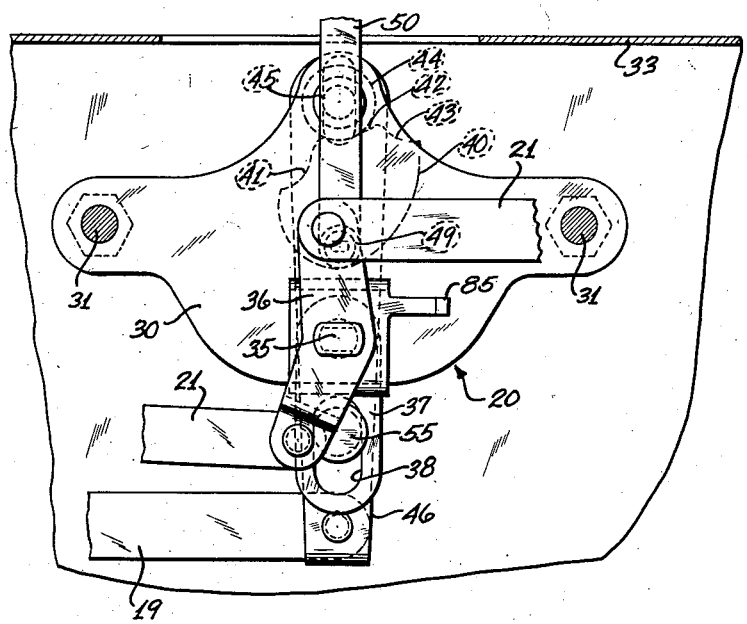
Fig. 4 is a front view of the structure in Fig. 3.
Figure 6:
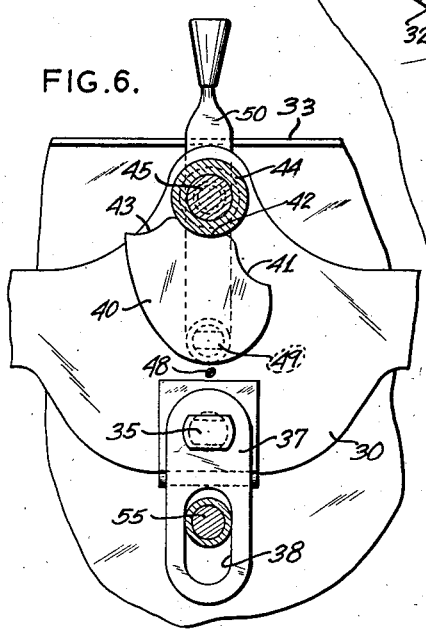
Fig. 6 is a rear view and section of the structure in Fig. 5 taken substantially on line 6—6 thereof.
Figure 5:
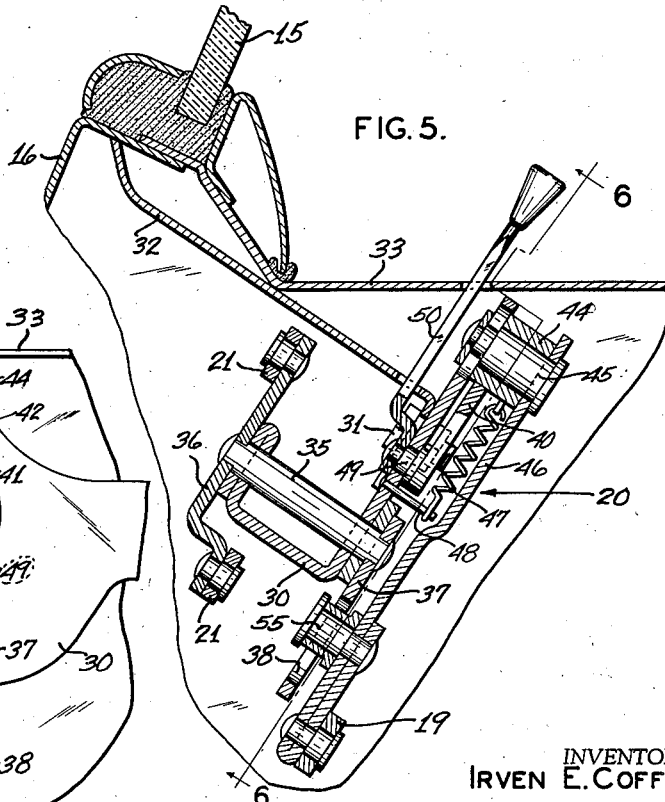
Fig. 5 is a vertical, longitudinal section through a portion of the windshield and cowl portions of an automobile and showing the middle portion of the transmission mechanism in vertical section.
Figure 7:
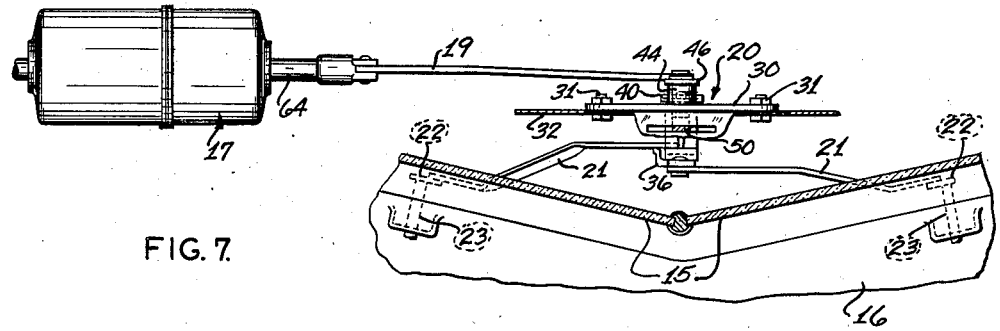
Fig. 7 is a horizontal section through a portion of the windshield and showing the driving motor and transmission in top plan.

The leverage mechanism 20 at the center of the transmission is illustrated in Figs. 2–7, inclusive. This mechanism is carried by a bracket 30 secured by means of bolts 31 to a plate 32 extending between cowl 16 and a horizontal sheet 33 forming a forward extension on the dashboard 34 (Fig. 2). A shaft 35 rotatably mounted in bracket 30 rigidly mounts an oppositely extending lever 36 at its forward end and at its rearward end is rigidly secured to a depending lever 37 having a longitudinal slot 38. Also pivoted on bracket 30 above shaft 35 is a cam 40 having a series of depressions 41, 42 and 43 in its upper edge for a purpose to be described hereafter. A bushing 44 is normally supported in the center depression 42 in cam 40 and rotatably receives a pin 45 which pivotally supports a long, depending lever 46. Bushing 44 is maintained firmly seated against the upper edge of cam 40 by means of a spring 47 secured at its upper end to the bushing and at its lower end to a pin 48 projecting rearwardly from bracket 30. A pin 49 rigid with the lower portion of cam 40 is rotatably received in bracket 30 and rigidly mounts a hand lever 50 for rotating the cam to alter the position of the pivotal support 44 of long lever 46 relative to pivot 35.

A pin 55 projecting forwardly from long lever 46 slightly above the lower extremity thereof has a rather snug transverse fit in slot 38 in short lever 37 but is free to slide radially therein. Link 19 connects the lower extremity of long lever 36 to motor 17. Links 21 connect the upper and lower extremities of double lever 36 to levers 22 on the wiper shaft 23.

Figure 8:
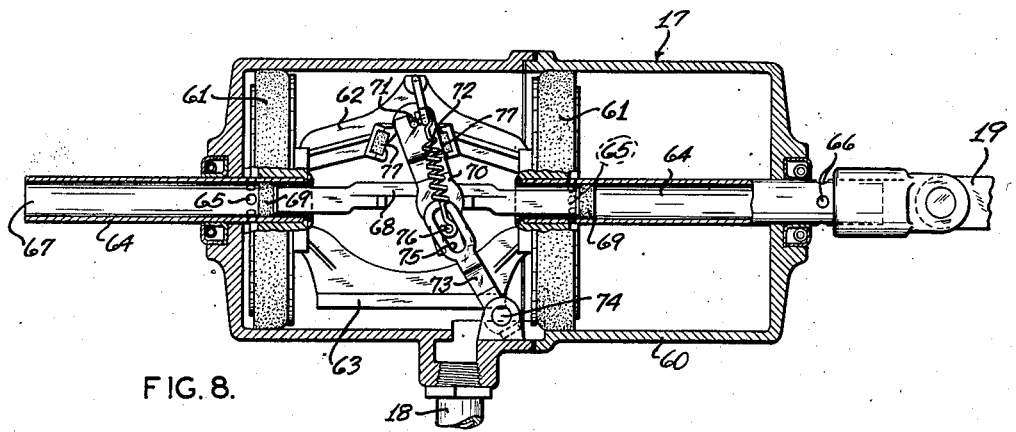
Figs. 8 and 9 are vertical, longitudinal center section views showing the driving motor, Fig. 8 showing the motor valves just after tripping and Fig. 9 showing the valves just prior to tripping.
Figure 9:
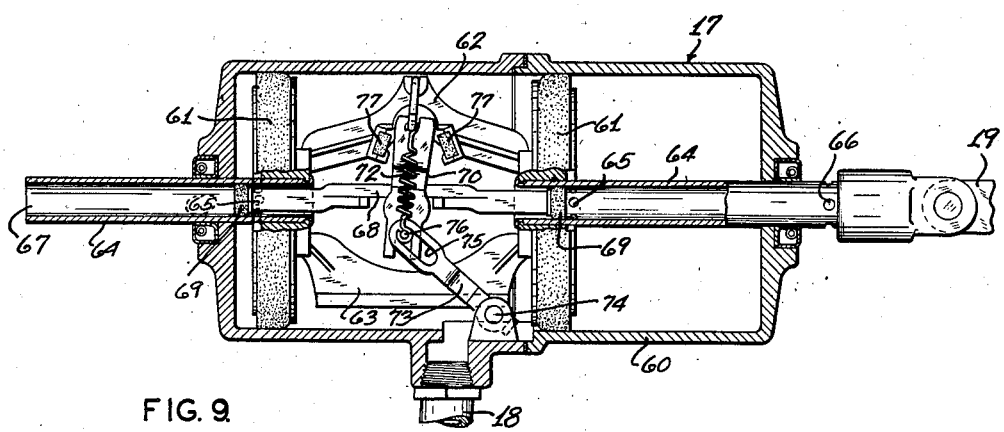

Figs. 8 and 9 show a suitable fluid pressure motor, that shown being more fully disclosed and claimed in an application filed April 4, 1939, Serial No. 265,883 in the name of the present inventor. This motor, generally indicated at 17, comprises a casing 60 enclosing longitudinally slidable pistons 61, rigidly connected by yokes 62 and 63. Hollow piston rods 64 project outwardly from the pistons through the end walls of the casing and are provided with peripheral openings 65 near the inner extremities thereof, but outside the pistons at all times, and right hand rod 64 is provided with additional openings 66 which are always exposed to atmosphere outside the casing. Left hand rod 64 is open to atmosphere at its outer end, as at 67. To the outer end of right hand rod 64 there is pinned the link 19 extending to long lever 46 forming part of the transmission.

A rod 68 extending between yokes 62 and 63 has valve members 69 at its ends slidable in tubes 64 across holes 65 so as to alternately expose the pressure chambers at the ends of the casing to atmosphere admitted through the outer ends of the tubes and suction through connection 18 and the space between the pistons. An over-center or toggle link 70 is pivoted at 71 to yoke 62 and provided with a coiled tension spring 72 for enforcing snap action of the link. A second link 73 is pinned at 74 to the inner wall of the casing and has a slot 75 in its upper portion slidably receiving a pin 76 at the lower end of toggle link 70. The lower link 73 functions as a stop to enforce overcenter movement of toggle link 70 when the piston structure has reached the end of its stroke, as shown in Fig. 8. Fig. 9 shows the piston structure just prior to tripping, or in the parked position, as described hereafter. Resilient stops 77 on yoke 62 limit the movement of toggle link 68.

Figure 10:
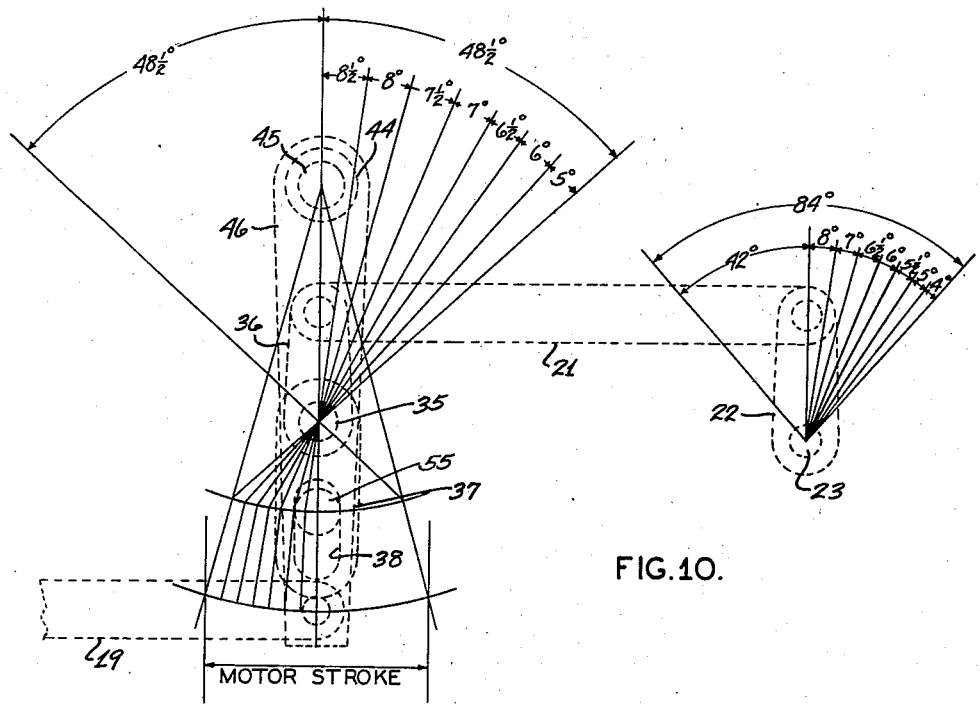
Fig. 10 is a diagrammatic representation showing a part of the transmission and illustrating what I term the differential angular movement of the wiper shaft.

The operation of the mechanism above described is as follows:

As indicated in diagrammatic Fig. 10, reciprocation of link 19 back and forth in an approximately straight line rotates long lever 46 about its pivotal support 44 and through pin 55 also rotates short lever 37 and double ended lever 36 connected to wiper shaft 23 by link 21 and lever 22. During the uniform oscillation of link 19, pin 55 slides radially in slot 38 in short lever 37, which has the effect of progressively increasing the leverage or eccentricity between motor connection 19 and wiper connecting link 21. The result is, as indicated in Fig. 10, to cause rapid movement of wiper driving lever 36 at the center of its stroke and relatively slow movement thereof at the ends of the stroke. This is diagrammatically represented by the decreasing angular displacement of lever 36 per unit of linear travel of link 19 as the lever moves from the center to the end of its stroke.

Figures 11, 12:
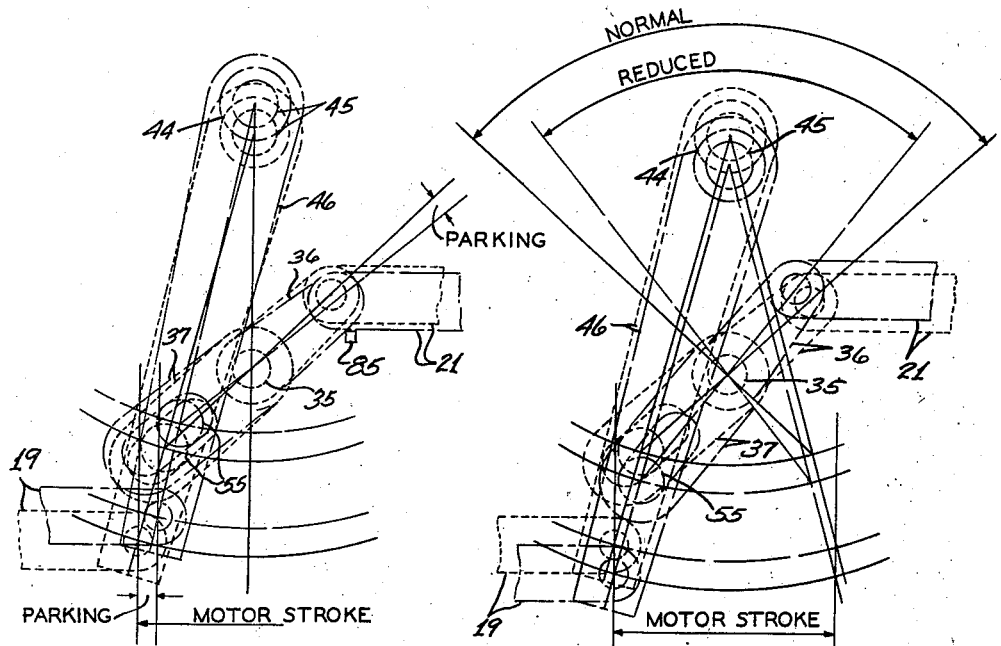
Fig. 11 is a diagrammatic representation showing a portion of the transmission mechanism in parked position.
Fig. 12 shows a part of the transmission mechanism altered so as to shorten the stroke of the wiper arm and blade.

In order to vary the path of movement of wiper arms 24 upon the surface of the windshield panes, cam 40 is rotated by means of handle lever 50, located within easy reach of the driver. If the cam is rotated counterclockwise (Fig. 6) bushing 44 and pin 45 forming the pivotal support for long lever 46, are lowered into recess 41. The result of this variation of the leverage is indicated in Fig. 12, from which it appears that with lever 46 so lowered, the stroke of lever 36 is decreased, as indicated by the arc marked "Reduced." This shortens the stroke of the wiper arms, as indicated by the dot and dash lines 80 in Fig. 1, the dotted lines 81 representing the extremities of the normal stroke with bushing 44 in the middle recess 42 in cam 40.

If cam 40 is rotated clockwise to elevate bushing 44 into recess 43 in the cam, the stroke of lever 36 is correspondingly increased so as to cause this lever, before reaching the right hand end of its movement (Figs. 4 and 11), to engage a stop 85 projecting from bracket 30. This stop is positioned so that at the point of such engagement, the motor piston structure will be positioned, as indicated in Fig. 9, just short of the end of its stroke and the valves will be prevented from tripping. Thus, suction will be constantly transmitted through connection 18 and holes 65 to the left hand end of the casing so as to maintain the parts in the parked position. I have shown the stop 85 positioned to permit a slight over-travel of the wiper arms to the lines designated 86 in Fig. 1, but the blades may be parked within the normal stroke range simply by the expedient of moving stop 85 slightly to the left in Figs. 4 and 11.

Figure 13:
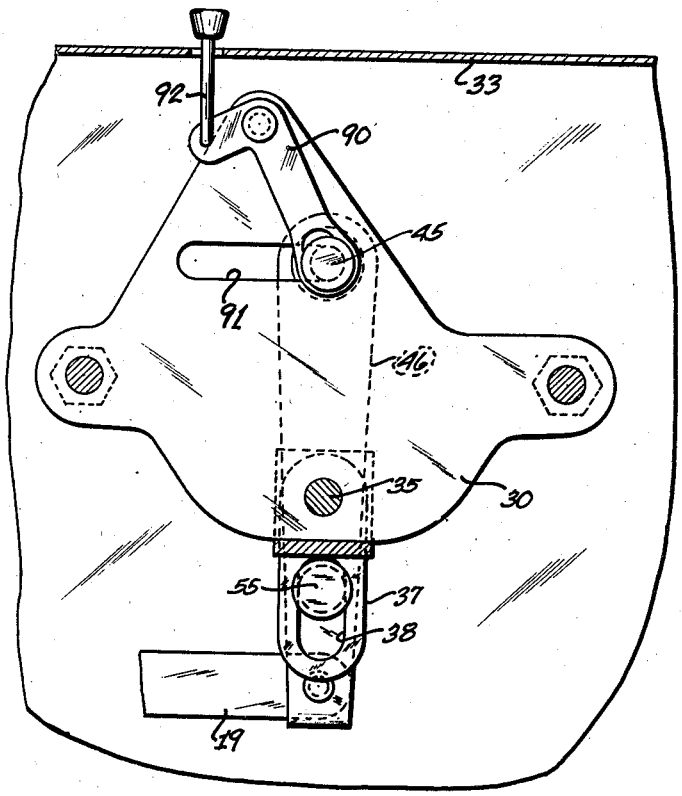
Fig. 13 is a view similar to Fig. 6 but showing a modification.
Figure 14:
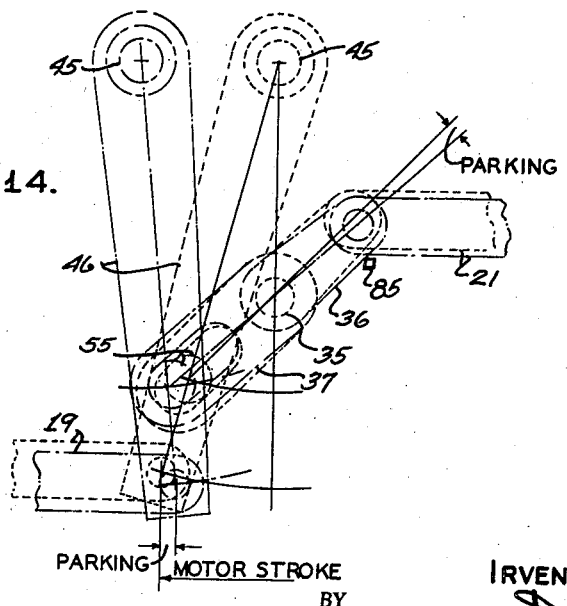
Fig. 14 is a diagrammatic representation of the device in Fig. 13.

In Fig. 13 the cam 40 is replaced by a bell crank lever 90 pinned to the top of long lever part 46 pivotally supported in a horizontal slot 91 in bracket 30. A wire 92 extends from the bell crank above plate 33 for operation by the driver. Pulling out the wire displaces lever 46 so as to move the path of lever 36 (see Fig. 44) so as to cause the latter to engage stop 85 before the motor valves have tripped, as in Fig. 9.

The structure described, therefore, provides for transmitting back and forth movement of the driving mechanism to a rotating wiper arm to cause relatively slow angular velocity of the arm at the ends of its stroke. Means is also provided for selectively shortening or lengthening the normal stroke of the wiper arm, shortening of the stroke being particularly advantageous where ice and snow become packed at the normal end thereof. The parking means functions to park the wiper blade as close as possible to the lower edge of the windshield without directly affecting the motor or its valves.

The form of motor shown is not essential and other forms of fluid motors having self-tripping valves may be used and, in fact, the principles of the invention may be utilized with electric or so-called mechanical driving mechanisms. The invention may be modified in these and other respects as will occur to those skilled in the art and the exclusive use of all such modifications as come within the scope of the appended claims is contemplated.

I claim:

1. In a windshield wiper, driven mechanism including a member supported for oscillation with the wiper blade, an oscillating driving member, a pivoted lever having eccentric connections to both of said members, and means to vary the eccentricity of one of said connections so as to vary the operative path of said wiper element.

2. In a windshield wiper, driven mechanism including a member supported for oscillation with the wiper blade, an oscillating driving member, a first pivoted lever connected to said driving member, a second pivoted lever connected to said wiper member and eccentrically connected to said first lever for transmission of oscillations therebetween, one of said levers having a stationary pivot, and manual means for varying the position of the pivotal support of the other lever so as to vary the operative path of said wiper element.

3. In a windshield wiper, a driven member supported for oscillation with the wiper blade, an oscillating driving member, a first lever connected to said driving member and having a movable pivot, a second lever having a stationary pivot and connected to said wiper member and also eccentrically connected to said first lever, and means to relatively vary the position of the pivotal support of said first lever to vary the effective lever arm between said lever and the operative path of said wiper member.

4. Windshield wiper mechanism as specified in claim 3 in which said pivot varying means is capable of movement in directions to both shorten and lengthen the stroke of said wiper member.

5. In a windshield wiper, self-reversing driving mechanism including a movable member, driven mechanism including a member oscillatable with the wiper blade, transmission mechanism including pivoted structure eccentrically connected to both of said members and forming a leverage connection therebetween, and parking means comprising a device to shift said transmission mechanism and vary the effective leverage of said connection and an abutment engageable by a part of said transmission mechanism when so shifted to limit the travel thereof and stop the wiper.

6. In a windshield wiper, driving mechanism including a movable member and a device to reverse the movement of said member at the ends of its stroke, driven mechanism including a member oscillatable with the wiper blade, transmission mechanism including pivoted lever structure eccentrically connected to said members and forming a leverage connection therebetween adapted to traverse a predetermined path during normal operation, and parking means comprising a device to shift an operative element of said transmission mechanism to vary the effective leverage of said connection whereby said transmission mechanism is caused to traverse a different path during the normal stroke of said driving mechanism, and an abutment engageable by a part of said transmission mechanism when so shifted to stop the wiper.

7. A windshield wiper as specified in claim 6 in which said abutment is located to stop said mechanisms after shifting of said transmission mechanism when said driven member has been moved to a point adjacent the end of its normal stroke and prior to the end of the normal stroke of said driving mechanism.

8. In a windshield wiper, driving mechanism including an oscillating member and means to reverse said mechanism at the ends of its normal stroke, driven mechanism including a member oscillatable with the wiper blade, transmission mechanism comprising a pair of pivoted levers eccentrically connected together for joint operation, each of said levers being connected to one of said oscillating members whereby said levers constitute a leverage connection between said members, one of said levers having a part adapted to traverse a predetermined path during operation, and parking means comprising a stationary abutment positioned outside said normal path and a device to shift the pivotal support of at least one of said levers so as to vary the normal path of said lever part and cause the same to engage said abutment before reaching the end of its stroke to stop the wiper.

9. In a windshield wiper, driven mechanism including an element oscillatable with the wiper blade, driving mechanism including a yieldingly oscillatable element and a device actuated by said driving mechanism at the ends of its stroke to reverse the same, transmission mechanism including a pair of levers having pivotal support and eccentrically connected to each other, each of said levers being eccentrically connected to one of said oscillatable elements, a stop engageable by a part of said transmission mechanism to limit the stroke thereof in one direction, and manual means to vary the relative positions of the pivotal supports of said levers and thereby alter the effective lever arms of said transmission mechanism and cause said part to engage said stop before said driving mechanism actuates said reversing device for parking.

10. In a windshield cleaner drive, a linearly reciprocating driving member, a pivoted member eccentrically connected thereto, a second pivoted member pivotally supported at a point spaced radially from the pivot of said first pivoted member, a wiper shaft for directly imparting oscillation to the wiper arm, and a lever rigid on said shaft and eccentrically connected to said second pivoted member for operating said shaft, said pivoted members having eccentric sliding contact with each other for transmitting motion therebetween whereby the effective leverage applied to said second pivoted member is increased as it approaches the ends of its stroke and the speed of rotation of the same and of said shaft is, correspondingly, decreased prior to reversing.

IRVEN E. COFFEY.